United States Patent
Speelmans et al.

(10) Patent No.: US 10,149,020 B2
(45) Date of Patent: Dec. 4, 2018

(54) METHOD FOR PLAYING A MEDIA STREAM IN A BROWSER APPLICATION

(71) Applicant: THEO Technologies, Leuven (Wilsele) (BE)

(72) Inventors: Pieter-Jan Speelmans, Diest (BE); Maarten Tielemans, Langdorp (BE); Steven Tielemans, Leuven (BE)

(73) Assignee: THEO TECHNOLOGIES, Leuven (BE)

( * ) Notice: Subject to any disclaimer, the term of this patent is extended or adjusted under 35 U.S.C. 154(b) by 0 days.

(21) Appl. No.: 14/909,691

(22) PCT Filed: Aug. 4, 2014

(86) PCT No.: PCT/EP2014/066696
§ 371 (c)(1),
(2) Date: Feb. 2, 2016

(87) PCT Pub. No.: WO2015/018782
PCT Pub. Date: Feb. 12, 2015

(65) Prior Publication Data
US 2016/0173954 A1    Jun. 16, 2016

(30) Foreign Application Priority Data

Aug. 6, 2013 (EP) .................................... 13179425

(51) Int. Cl.
*H04N 21/61* (2011.01)
*H04N 21/845* (2011.01)
(Continued)

(52) U.S. Cl.
CPC ......... *H04N 21/6125* (2013.01); *G11B 27/10* (2013.01); *H04N 21/236* (2013.01);
(Continued)

(58) Field of Classification Search
None
See application file for complete search history.

(56) References Cited

U.S. PATENT DOCUMENTS 5,918,012 A * 6/1999 Astiz ................. G06F 17/30855
707/E17.013
8,214,475 B1 * 7/2012 Scofield .............. H04L 67/1053
709/217
(Continued)

FOREIGN PATENT DOCUMENTS

| EP | 1143353 A2 | 10/2001 |
|---|---|---|
| WO | 2008094279 A1 | 8/2008 |
| WO | 2013052780 A1 | 4/2013 |

OTHER PUBLICATIONS

Ozer, "What is HLS (HTTP Live Streaming)?", Streamingmedia.com, Oct. 14, 2011, 3 Pages.
(Continued)

*Primary Examiner* — Justin E Shepard
(74) *Attorney, Agent, or Firm* — Workman Nydegger

(57) ABSTRACT

Media comprising media segments is played in a browser application. The segments comprise video and/or audio payload data encoded by a codec supported by this browser application. To play the media, several steps are performed by the browser application. First, a first subset of media segments of the media is obtained from a server. Then, a first media file is constructed comprising the video and/or audio payload data of the first subset of media segments. In a third step, a second subset of media segments of the media is obtained from the content distribution network whereas the second subset is consequent in time to the first subset. Then, the second media file is constructed comprising the video and/or audio payload data of the second subset of media
(Continued)

segments. Finally, the first and second media files are played in the browser according to the codec.

16 Claims, 6 Drawing Sheets

(51) Int. Cl.
    *G11B 27/10*     (2006.01)
    *H04N 21/236*     (2011.01)
    *H04N 21/2385*     (2011.01)
    *H04N 21/242*     (2011.01)
    *H04N 21/262*     (2011.01)
    *H04N 21/43*     (2011.01)
    *H04N 21/431*     (2011.01)
    *H04N 21/435*     (2011.01)
    *H04N 21/458*     (2011.01)
    *H04N 21/81*     (2011.01)
    *H04N 21/854*     (2011.01)

(52) U.S. Cl.
    CPC ....... *H04N 21/2385* (2013.01); *H04N 21/242* (2013.01); *H04N 21/262* (2013.01); *H04N 21/4302* (2013.01); *H04N 21/435* (2013.01); *H04N 21/4312* (2013.01); *H04N 21/458* (2013.01); *H04N 21/8173* (2013.01); *H04N 21/8193* (2013.01); *H04N 21/8456* (2013.01); *H04N 21/85406* (2013.01)

(56) References Cited

U.S. PATENT DOCUMENTS

| | | | | |
|---|---|---|---|---|
| 2002/0082730 A1* | 6/2002 | Capps | ................... | H04N 21/40 |
| | | | | 700/94 |
| 2008/0021775 A1* | 1/2008 | Lerman | ................. | G06Q 30/02 |
| | | | | 705/14.73 |
| 2009/0328124 A1* | 12/2009 | Khouzam | ...... | H04N 21/234354 |
| | | | | 725/116 |
| 2011/0082946 A1* | 4/2011 | Gopalakrishnan | ........................... |
| | | | | H04L 65/4084 |
| | | | | 709/231 |
| 2012/0005366 A1* | 1/2012 | Ma | ................... | H04N 21/44209 |
| | | | | 709/231 |
| 2014/0267395 A1* | 9/2014 | Ross | ........................ | G06F 3/14 |
| | | | | 345/633 |
| 2014/0280754 A1* | 9/2014 | Gogoi | ................. | H04L 65/601 |
| | | | | 709/219 |

OTHER PUBLICATIONS

Extended European Search Report for corresponding European Application No. 13179425.7, dated Apr. 7, 2014.
International Search Report for corresponding International PCT Application No. PCT/EP2014/066696, dated Nov. 25, 2014.

* cited by examiner

METHOD FOR PLAYING A MEDIA STREAM IN A BROWSER APPLICATION

FIELD OF THE INVENTION

The present invention generally relates to the streaming and downloading of media content to a browser application running in a client. It further relates to the playing of the media content that is downloaded on a segment by segment basis.

BACKGROUND OF THE INVENTION

When a user visits a web page containing media, for example audio, video or both, a video is displayed or audio player is activated in the browser window of the browser application. The media itself is available on a server or content distribution network somewhere on the internet or any other network as a media item. To allow the user to start watching or listening to the media before completely downloading the media, the media can be requested from the server in the form of multiple segments and each segment can be downloaded separately from the server. As soon as the first media segment is downloaded the browser application may start to present or play the media item. While doing so the next media segments are downloaded.

This way of downloading allows presenting a media item before the media item is completely downloaded. This results in a small delay between the start of the media item download and the actual playback of it. Moreover, when stopping or pausing the media item before the end, the download is stopped and, hence, only the needed video data was downloaded saving on network traffic and download quota.

Apart from the media segments, there is also information available on the server about the location of the media segments on the server and their respective timing. This information may be comprised in a single or in multiple files commonly referred to as manifest files. Before presenting the media, the browser application first retrieves this manifest file and selects the media segments to download.

HTTP Live Streaming (HLS) developed by Apple is a protocol describing such a way of downloading a media item, i.e. progressive downloading. In a client application supporting HLS, the client retrieves one or more manifest files containing links to all the video segments of a video item. Each video item may be available in several versions, each version referring to a different quality and/or resolution. When downloading the segments, the client can then choose in which quality or resolution the video chunk should be encoded based on a list present in one of the manifest files. The choice in quality and/or resolution by the client can depend on several factors such as screen resolution, bandwidth limitation or user inputs and/or preferences. In HLS, the video chunks are encoded according to the MPEG-TS protocol and downloaded as separate files. The video item is thus a succession of MPEG-TS encoded video segments. During display, the client downloads one or more of the next segments during display of a video item, hence supporting progressive download.

HLS is more commonly referred to as a HTTP adaptive streaming (HAS) protocol as it allows streaming of media content in an adaptive way, i.e. quality and resolution can be adapted during the streaming. For the downloading of the segments and manifests, HTTP GET requests are used. Other HAS protocols are for example Microsoft Smooth Streaming (MSS), HTTP Dynamic Streaming (HDS) by Adobe and Dynamic Adaptive Streaming over HTTP defined by the 3GPP standard (DASH).

A disadvantage of the HAS protocols is that none of them is natively supported by the HTML5 standard. The HTML5 standard supports the playback of a single media element without specifying the video format. As a result, implementations of HTML5 compliant browsers offer standard no support to play a HAS media item by linking to either a manifest file or a media segment, for example an MPEG-TS video segment. Therefore, to display a HAS video item, a browser plugin is needed or the HAS functionality must be implemented as an extra feature. Such a plugin or extra functionality needs to be especially developed for every browser application. Typically only a few browser applications have such a browser plugin or functionality available for a specific HAS protocol.

Therefore, it is the object of this invention to provide a method for playing multiple media segments of a media item in a browser application that overcomes the above disadvantages.

SUMMARY OF THE INVENTION

This is achieved by the method according to claim 1.

A content distribution network or CDN may range from a single file server to a large distributed system of servers located in multiple data centres across the Internet. These servers may then further comprise caching servers and proxy servers to assure a fast, low latency delivery from the CDN to the browser application. It is thus not necessary that the media segments reside on a single server. The media segments are portions of the media. Each portion covers a time interval of the media. Such a portion may, for example, be a MPEG-TS video segment or an MP4 audio or video file. The media to be played in the browser application may comprise audio, video or both and may thus be playable in an audio or video player of the browser application. As the method is performed in a browser application, the first and second media files may reside in temporary, cache or random access (RAM) memory making them only available to the browser application itself but guaranteeing fast and low latency access.

It is an advantage that the audio and/or video payload data is directly used in the construction of the first and second file and, hence, no transcoding, decoding or encoding is needed on the payload data in the browser application. As a result of this, the method may be implemented in a browser scripting language such as JavaScript which is part of the HTML protocol. Due to the low processing needs, the construction of the files is real-time and the files can thus be played in a streaming matter, i.e. playing the first media file while downloading the segments for the second media file. Even if the downloaded segments are not supported by the browser application, the constructed files are playable as the codec used for encoding the payload data at the side of the CDN is supported by the browser application.

The first and second file are thus played in the browser application and the construction of the files is done such that the obtained files are playable by the media player of the browser according to a browser protocol such as the HTML, or HTML5 protocol. In HTML5 for example, the playing of the first and second file may be achieved by surrounding a link to the first or second file with the <video> tag. It is thus an advantage that no plugins, for example Silverlight, Flash or Quicktime, are needed to perform the decoding and visualization of the media.

According to an embodiment the method further comprises that an streaming session is started with the CDN. This is accomplished by retrieving a manifest file from the CDN. The manifest file comprises segment information about the media segments that are available as files on the CDN. The first and second subset of media segments are then selected using this segment information.

Preferably the segment information comprises information about the location of each of said segments on the content distribution network. Obtaining a first and a second subset then comprises retrieving each of the segments of the first and second subset by sending a request to the content distribution network with the location of the segment as an argument.

By parsing a manifest file and selecting the segments based on the information in the manifest files, adaptive streaming is supported. This allows to select the segments based on the quality and bandwidth requirements of the client running the browser application. Even if the protocols used by the browser, such as HTML or HTML5, are not supporting adaptive streaming, the method allows to implement such support within the browser application by a browser supported scripting language such as for example JavaScript.

Advantageously the streaming session is an HTTP adaptive streaming session and the request is an HTTP GET request.

This has the advantage that protocols such as HLS, MSS, DASH or HDS can be supported within the browser application without using any plugins as the method is carried out by the browser application itself, for example by JavaScript code. Furthermore, by using the HTTP protocol, obstruction in retrieving the segments by firewalls or proxies can be avoided as, in general, they allow HTTP traffic to pass. This is not always the case for other, non-HTTP based protocols such as for example the Real Time Streaming Protocol (RTSP).

According to an embodiment the manifest file comprises codec information about available versions of the segments. This codec information specifies for each version a corresponding codec used for encoding the audio and/or video payload data of the segments. The method then further comprises selecting a version of the segments based on the codec information such that the corresponding codec is supported by the browser application.

In other words, the manifest file lists several versions of the segments and thus also of the corresponding media whereby each version provides the media and segments encoded by a different codec. As the browser application may not support all possible codecs for playback of media within the media player of the browser application, this allows to pick a version having segments encoded by a codec supported by the browser.

According to an embodiment the media segments comprise index information, which, on its turn, comprises location information about the location of the audio and/or video payload data within the media segments. The method then further comprises the steps of:

Extracting the video and/or audio payload data from the media segments by using this index information.

Storing the video and/or audio payload data.

Using the stored video and/or audio payload data for said constructing steps.

This allows to retrieve the video and/or payload data from a segment even if the data is not ordered within the segment as it should be according to the resulting file format to have it playable by the browser application. This also allows to skip additional data that may not be needed in the resulting file such as for example subtitles or different audio streams. The index information may further also comprise synchronization information about the time interval of the audio and/or video payload within the media. So every piece of payload data may be accompanied by timing information on how to align the data in time with the other payload data. This information may be reformatted in a form that is compliant by the formation of the first and second file.

According to an embodiment the step of playing may further comprise:

playing the first media file in a first player of the browser application;

loading the second media file in a second player of the browser application while playing the first media file;

starting to play the second media file at the end of playing the first media file.

When playing the two files in the same player, it would take some time to switch between the first and second video causing a visible or audible transition effect. Therefore, the above embodiment has the advantage that the media can be played in an almost seamless way. As everything is prepared for playing the second file at the end of playing the first file, the second player only needs to start when the first player stops to assure an almost smooth transition between the playing of the two files.

In the case where the first and second media players are video players for playing video on a display used by the browser application, the playing step in the method according to the embodiment above may further comprise:

Initializing and hiding said second video player before said loading.

Positioning the second video player in the same position as the first video player on the display;

Hiding the first video player at the end of playing the first media file;

Un-hiding the second video player at the end of playing the first media file.

The two video players are thus positioned on top of each other making one or the other visible. At the end of playing the first file on the first player, the only thing needed to be done is to toggle the visibility or order of the players and start the second player. This allows a smooth transition in the videos with limited visible glitches.

According to an alternative embodiment when using two different media players, constructing the second media file further comprises:

Putting a copy of the video and/or audio payload data from one or more of the last segments of the first subset of media segments in the second file.

The playing then comprises.

Playing the first media file in a first player of the browser application.

Loading the second media file in a second player of the browser application while playing the first media file.

Synchronously playing said first and second media file.

In other words, the last payload section of the first file is repeated at the beginning of the second file causing the media streams represented by the two files to be partially overlapping in time. Then, when playing the two files in two media players, the second media player is started during this overlapping portion, so that at some points the two media players are playing synchronously. This has the advantage that it eliminates possible glitches that are still persistent when starting the second player after the first player as this may induce a minimal delay between the playing of the two files.

Advantageously in the case were the first and second players are again video players for playing video on a display used by the browser application, the playing may further comprise:

Initializing and hiding the second video player before the loading;

Positioning the second video player in the same position as the first video player on the display;

Hiding the first video player and unhiding the second video player during said synchronously playing.

During the synchronously playing, the second video player is thus already displaying content, although not visibly on the display. The switching between the players is then only limited to a change in visibility or order of the players. This assures a smooth transition in video when going from one file to the other. The HTML protocol supported by a browser application allows to perform this positioning, hiding and unhiding of a video player in a very convenient way.

Optionally, the first and second video players comprise depth attributes defining the order of appearance in depth when displaying said video players on said display, and wherein said hiding comprises assigning a depth attribute to said first player such that said first video player appears below said second player on said display.

The depth attribute allows to perform the (un)hiding in a convenient way as the layering of objects on a display is an inherent property of browser applications. The (un)hiding is then performed by changing a single attribute value of an object in the browser application.

Furthermore, the first and second video player may comprise a transparency property for defining the transparency of the first and second video player on the display. The hiding of the first video player then comprises gradually increasing the transparency of the first video player.

In other words, the second video player which is positioned underneath the first video player will become gradually more and more visible during the synchronously playing of two players. The (un)hiding is thus a gradual process. The advantage of this gradual (un)hiding is that small positioning errors of a few pixels or small timing errors between the two players are masked away by the mixing of the two video players.

According to a further embodiment of the alternative embodiment, when the media segments comprise audio payload data having a volume level, the constructing the first media file comprises fading out the volume level of the audio payload data that will be synchronously played. The constructing of the second media file then comprises fading in the volume level of the audio payload data that will be synchronously played. The fading in and fading out is performed such that the total volume level stays substantially unchanged This has the effect that during the synchronously playing the volume level of the audio in the first player will gradually decrease and the volume level of the audio in the second player will gradually increase. The transition of the audio between the two files is thus smoothened in time by cross-fading the volume levels. The fading of the volume levels is done in such a way that the sum of the volume levels, i.e. the total volume of the perceived audio, is substantially the same as the volume level of one of the original segments.

This has the advantage the total volume level is perceived as unchanged during the synchronously playing of the media. When this is not done and the second player is started the total volume perceived may be louder than when playing one of the files alone.

Alternatively to the fading of the volume levels of the audio within the files, the synchronously playing may comprise gradually decreasing the volume level of the first media player; and wherein the synchronously playing further comprises gradually increasing the volume level of the second media player; the gradually decreasing and increasing being performed such that the total volume level stays substantially unchanged.

According to this alternative, the volume level are thus not changed by altering the audio payload data of the media, but by changing the volume level of the player playing the media. This has the advantage that the payload data can remain unchanged during the construction of the files and that the change of the volume level is taken care of by the player itself.

DETAILED DESCRIPTION OF EMBODIMENT(S)

Figure 1:
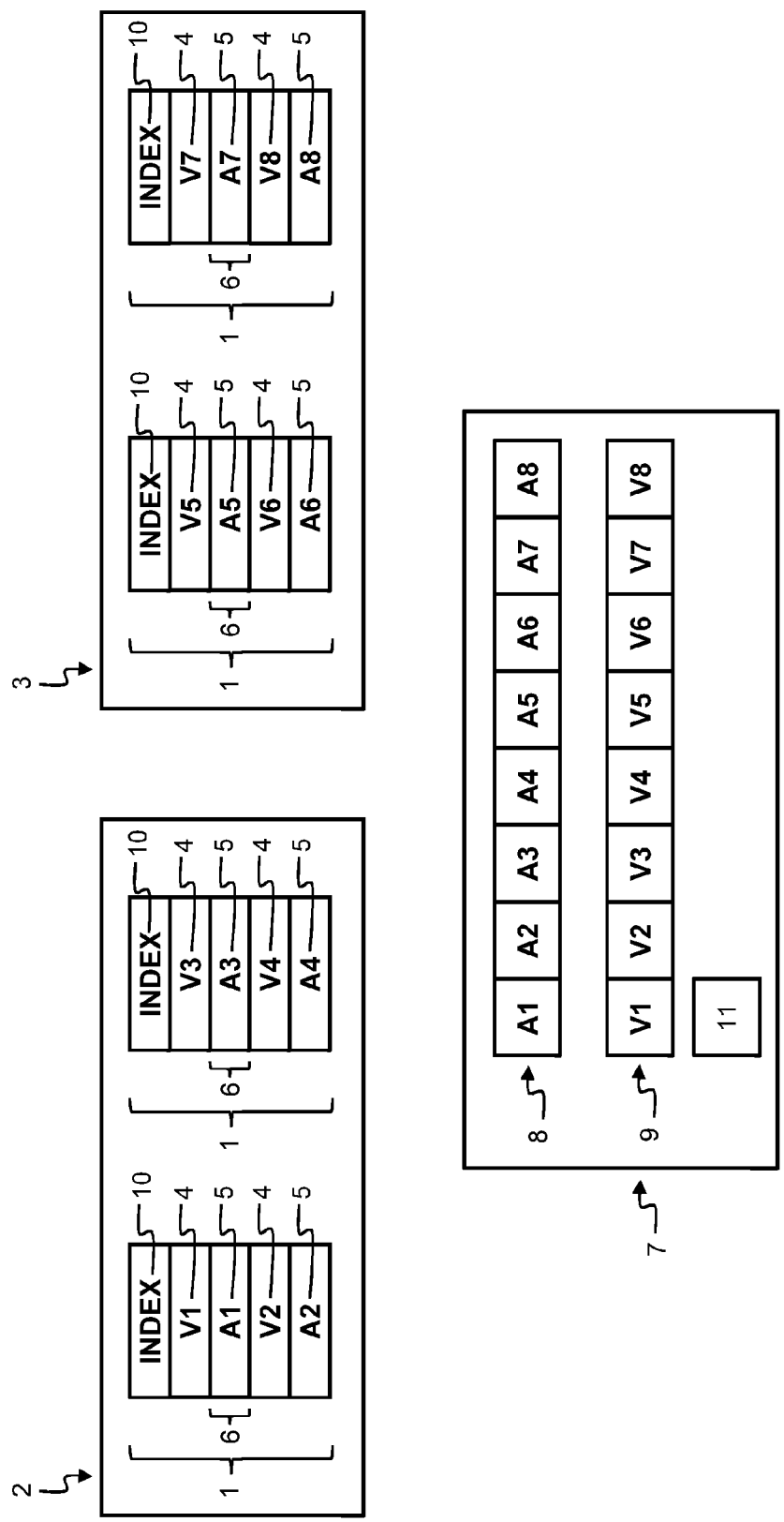
FIG. 1 illustrates the obtaining of a first subset and second subset of media segments according to an embodiment of the present invention.

FIG. 1 illustrates how a first subset 2 and a second subset 3 of video segments of a media item are obtained and stored in a browser application according to a preferred embodiment of the present invention. A user interacting with a browser application running on a client, for example a personal computer, tablet or smartphone, is surfing on the internet and arrives on a web page that comprises a reference to a media item available on the internet on a server or content delivery network (CDN). The media item may be a video stream or audio stream. This media item is encoded according to the HTTP Live Streaming (HLS) protocol and thus available as segments, where each segment 1 contains a part of the media for a certain time interval. In HLS these time intervals typically range from 1 to 10 seconds. The link to the media item links to a manifest file that comprises information on the segments such as the location of each segment and the codec used for encoding the payload data, i.e. the actual audio 5 and/or video 4 payload data within the segments. If the media player of the browser application has support for the used codecs, the browser application continuous, otherwise a message may be displayed that the media cannot be played as the codecs for decoding the payload data are not supported or available. By the downloading of the manifest file, a streaming session is started with the CDN. Optionally, the manifest file may provide information on the availability of different versions of the segments wherein the payload data of each version is encoded with a different codec. When different codec versions are available, the browser application selects the version of the segments that are supported by the browser application.

In HLS, the segments 1 are formatted according to the MPEG-TS protocol and often referred to as fragments. Each MPEG-TS segment is divided in packets 6 each having a length of 188 bytes. The first packet in the segment is a header packet comprising index information 10 about the timing of the fragment within the media and further details on the program streams within the fragment. Each such a program stream may be a video stream, an audio stream or any other stream such as a subtitle stream. The payload 5 of the audio stream and the payload 4 of the video stream is divided over several packets. Apart from the payload, a packet 6 also comprises further index information allowing to synchronize all payload data from the packets.

In order to play the media item, the browser application obtains a first set 2 of one or more MPEG-TS segments by retrieving the link to the segments from the manifest file and downloads the respective segments. In HLS the downloading is typically performed by issuing an HTTP GET request to the server. As the MPEG-TS segments 1 are not supported by the browser application, the media segments need to be reformatted to a compatible format supported by the browser application. Therefore, the payload data is extracted from the packets 6 by inspecting the index information 10 in the header packet and in the beginning of each packet comprising payload data. The payload data is then stored in a data object 7 within the browser application. The data object 7 thus comprises the payload data parts A1, A2, A3 and A4 for the audio 8 and the payload data parts V1, V2, V3 and V4 for the video 9. Also synchronization information 11 is further extracted from the fragments in the set 2 so that the audio and video can later on be played in a synchronous way. The synchronization information 7 is also stored in the data object 7.

Then, from the first subset of segments, a first media file is constructed. The constructed file is formatted as an MPEG-4 Part 14 media file, more commonly referred to as an MP4 file. It comprises both the video payload data V1-V4 and audio payload data A1-A4 from the first subset 2 of segments. As the payload data remains unaltered, it can be directly copied from the data object 7 into the MP4 file and, therefore, no computation intensive transcoding or re-encoding operation is required. The playback of an MP4 video file is supported by an HTML5 compliant browser application and therefore, the constructed file can be played in the video player of the browser application as long as the browser application supports the codec used for the encoding of the audio and video payload data. As the streaming of media is a continuous process, a second subset of segments 3 is downloaded during the playback of the first media file and its payload data is stored in the data object 7 the same way as for the first subset 2. Then, a second MP4 media file is constructed comprising the video payload data V5-V8 and the audio payload data A5-A8. This second file is then played again in the video player of the browser application. The process of downloading subsets of segments, constructing the video files and playing the files is repeated until the end of the media or video item or until the playback is stopped.

The constructing of the video files and how they are played in the browser application is described in more detail below.

Figure 2:
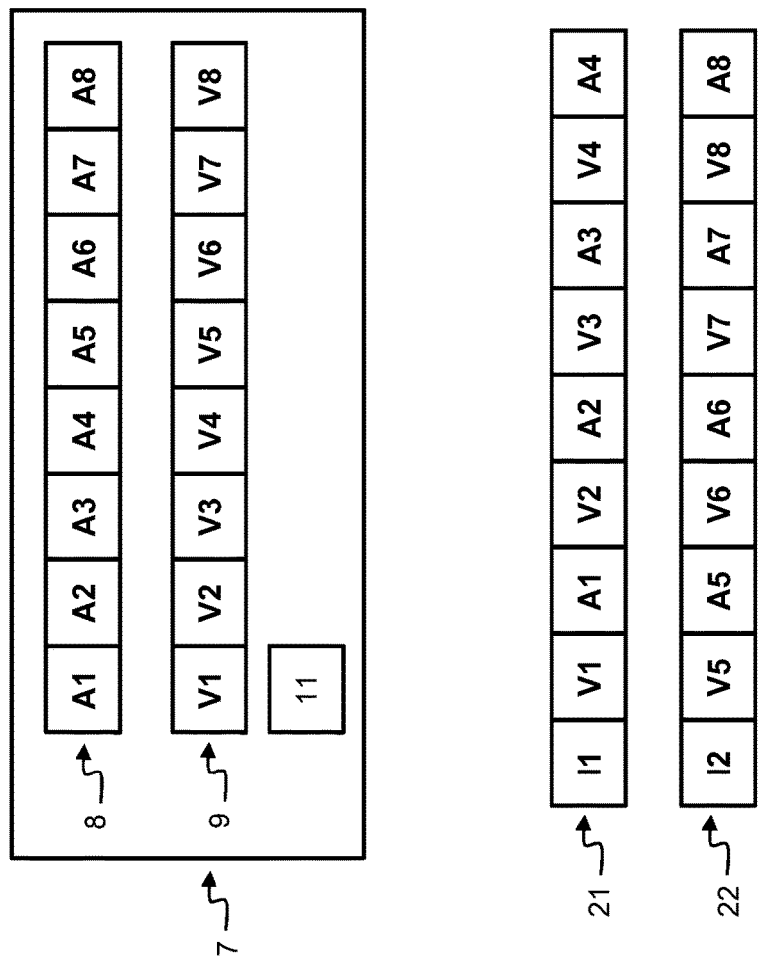
FIG. 2 illustrates the constructing of a first and second media file according to an embodiment of the present invention.

A first way of constructing the video files is illustrated in FIG. 2. The first video file 21 is constructed with the video payload data V1 till V4 and with the audio payload data A1 till A4. Also a header I1 is added to the file 21 for the purpose of synchronization of all the payload data. A second video file 22 is then constructed from the video payload data V5-V8 and the audio payload data A5-A8. Also a header I2 is added to the second video file 22. The two files thus comprise consecutive video portions in time of the complete video item that is to be played in the browser application.

Figure 3:
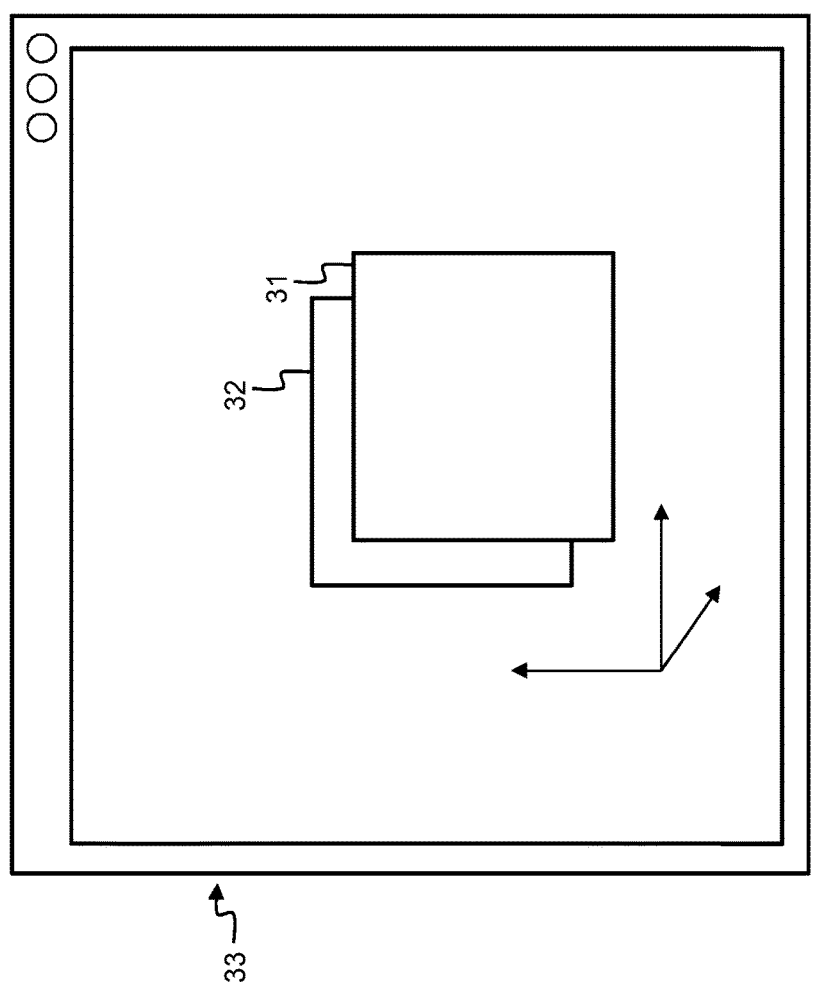
FIG. 3 illustrates video players in a browser window of a browser application.

For a continuous playback of the two video files 21 and 22, the files are then played one after the other without interruption. This is illustrated in FIG. 3. The first video file 21 is first loaded in a video player 31 within the browser window 33 of the browser application and played. The loading and playing may be done by using the HTML5 <video> tag. During the playback of the first file, a second video player 32 is initialized with the second video file 22, but this second video player 32 remains hidden from the viewer of the video item. When the first player 31 is at the end of playing the first video file 21, the second video player 32 is positioned in the same position as the first video player 31, the first video player is hidden from the viewer and the playback of the second video file is started. As the two video players 31 and 32 have exactly the same size and appearance, the viewer gets the impression that he is still watching the same video and is unaware of the transition between the two video files 21 and 22. For the hiding and unhiding of the video players Cascading Style Sheet (CSS) attributes may be used. The hiding of the video player 32 is then done by putting the CSS "visibility" property to "hidden". Alternatively, the "z-index" CSS property may be used. This property specifies the stack order or depth of an element in a browser window. The video player with the highest z-index value will then appear on top of the video player with the lower z-index value.

Figure 4:
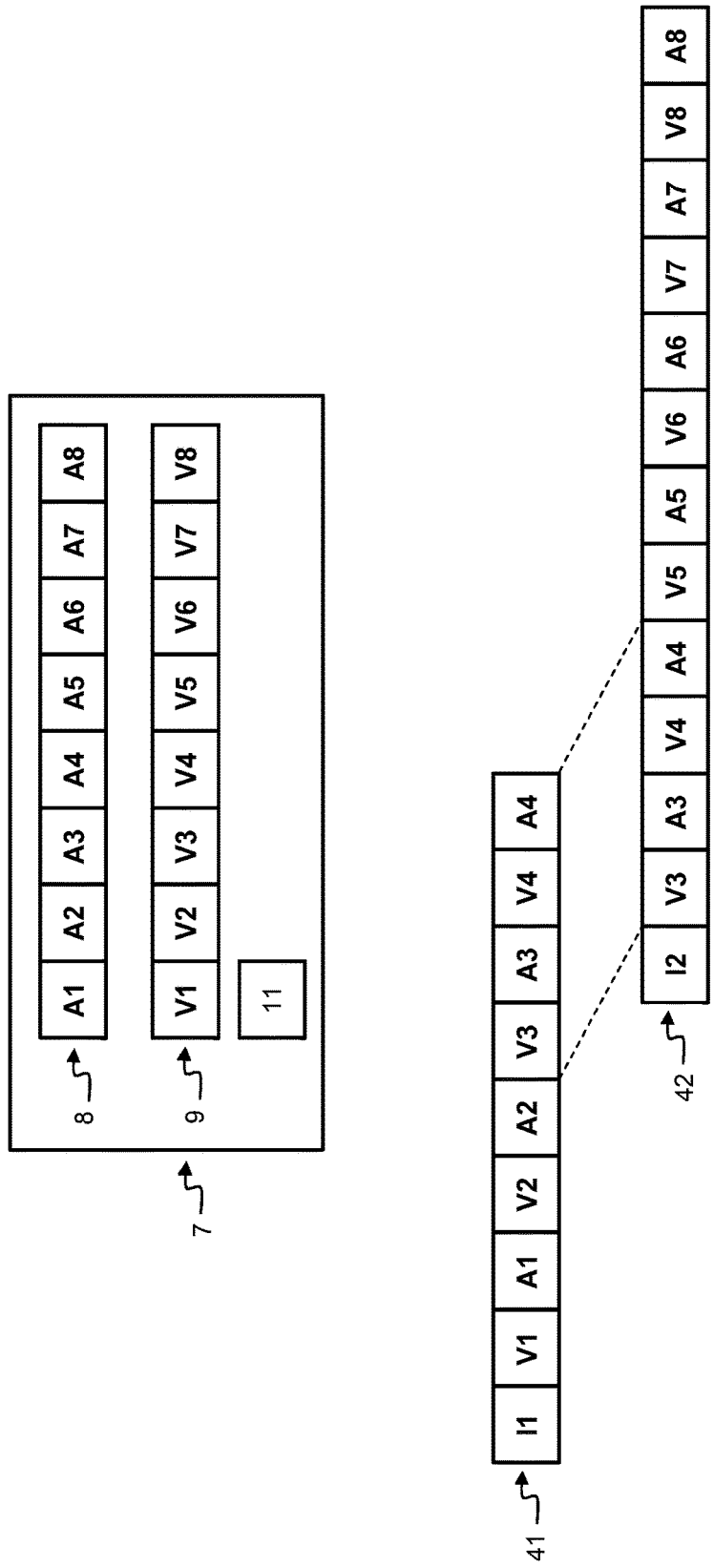
FIG. 4 illustrates the constructing of a first and second media file according to an alternative embodiment of the present invention.

A second way of constructing the video files is illustrated in FIG. 4. The first file 41 is constructed the same way as the first file 21 from FIG. 2. For the second file 44, the payload data of the last segment of the first subset 2, i.e. V3-V4 and A3-A4 is also put in the second file 44. The last portion in time of the video file 41 is thus the same as the first portion in time of the video file 42. In other words, the files 41 and 42 are thus overlapping.

Figure 5:
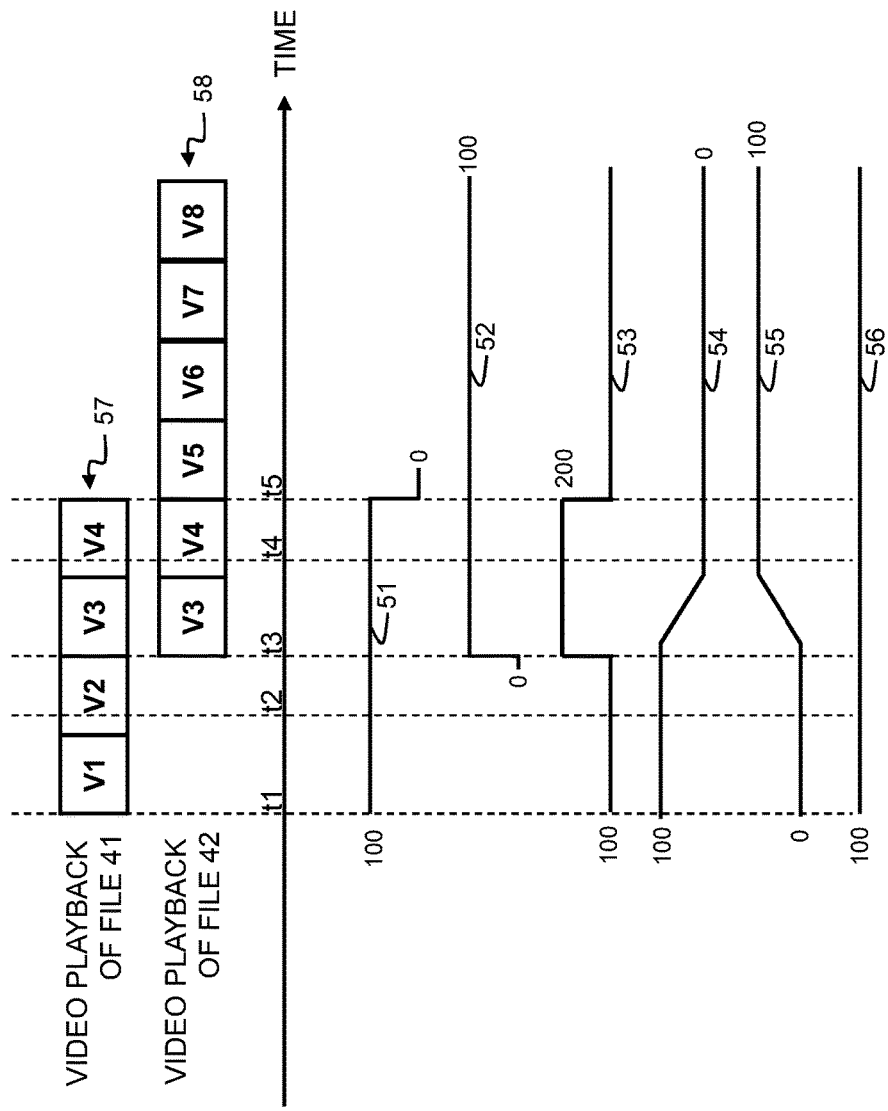
FIG. 5 illustrates the playing of a first and second media file according to a preferred embodiment of the present invention.

The playback of the two files 41 and 42 is illustrated in FIG. 5 where the playback of the video payload data is shown as a function of time. The upper bar 57 shows the playback of the video payload data V1-V4 in the first player 31 and the lower bar 58 shows the playback of the video payload data V3-V8 in the second player 32. First, the file 41 is loaded and started at a time t1 in the first player 31 within the browser window 33 of the browser application similar to the playback of the file 21 described above. During the playback of the file 41, at a time t2, a second video player 32 is initialized with the second video file 42 but hidden from the viewer. The playback of this file 42 is then started at a time t3 when the first video player 31 is at the transition in playing the video payload V2 and V3. At that moment, the two video players 31 and 32 play the video files 41 and 42 synchronously, i.e. each displaying the same video frame at the same time. At this time t3, the video player 32 is still hidden from the viewer. During this synchronously playing, at a time t4, the second player 32 is made visible to the viewer and the first player 31 is made invisible. From time t4 onwards the viewer thus sees the video player 32 playing the video file 42.

When there is no overlap in the playback of the video files as illustrated in FIG. 2 there may still be a visible and audible glitch due to the time needed to switch between the video players 31 and 32 depending on the browser application. By constructing and playing overlapping files 41 and 42 this kind of glitches are avoided as the viewer will always see and hear a video playing during the switching of the players 31 and 32.

During the playback of the overlapping files 41 and 42, there may be an increase in volume from time t3 till time t5 depending whether or not the browser application will produce sound when the first or second video player is hidden. This is illustrated in FIG. 5 where 51 shows the volume level of the first video player 31 as a function of time, where 52 shows the volume level of the second video player 32 as a function of time and where 53 shows the total volume perceived by the user as the sum of the volume levels 51 and 52. When the volume level has a value of 0, the audio is muted and when the volume level has a value of 100, it is at the level as originally present in the video. Due to the overlap of the video files 41 and 42, an increase in the volume is apparent during the overlapping period t3 till t5.

Figure 6A:
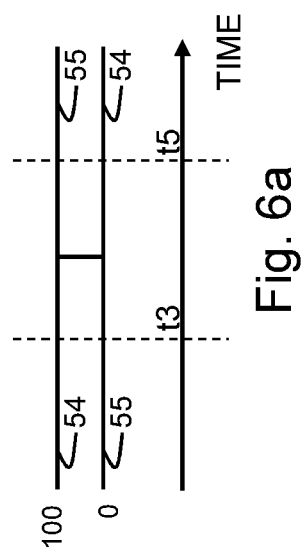
FIG. 6a-6c illustrates the cross fading of audio volume levels according to embodiments of the present invention.
Figure 6C:
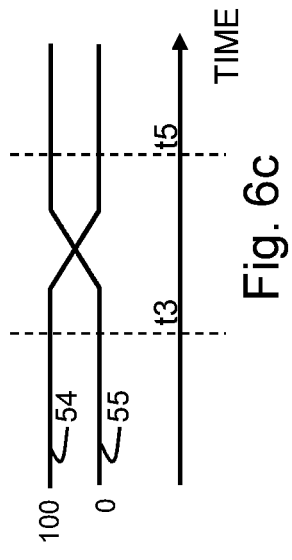
Figure 6B:
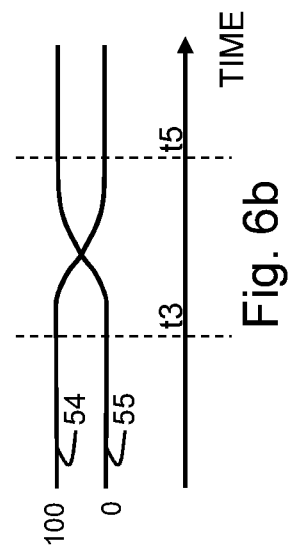

To solve this issue a cross-fading of the volume levels may be applied. This is also illustrated in FIG. 5. The volume level 54 of the first video player 31 is decreased during the overlapping period t3-t5 and at the same time the volume level 55 of the second player 32 is increased. This increasing 54 and decreasing 55 is done in such a way that the total perceived volume 56 remains equal, i.e. the same as in the original audio payload A3-A4. The increasing and decreasing of the volume level may be done in several ways, i.e. with several types of curves as shown in FIG. 6. In FIG. 6-a this is done in an abrupt way by muting the volume 55 in the beginning and then, at a certain moment, muting the volume 54 and putting the volume 55 to its original level. Instead of a linear curve as in FIG. 6-c, a higher order curve as shown in FIG. 6-b may also be used.

Adapting the volume levels 54 and 55 may be done by adapting the volume level of the video players 31 and 32 during playback of the files 41 and 42. The volume level of the video player 32 is then gradually increased during the synchronously playing to the two files 41 and 42 and the volume level of the video player 31 is then gradually decreased during the same period such that the total volume stays unchanged.

Alternatively, the volume levels 54 and 55 may be adapted during the constructing of the files 41 and 42. In order to do so, the audio payload data A3-A4 will have to be changed during the creation of the two files 41 and 42. During the construction of the file 41, the volume level of the audio payload data A3-A4 will have to be decreased to zero and during the construction of the file 42, the volume level of the audio payload data A3-A4 will have to be increased from zero to its original level. Again, the decreasing and increasing is done in such a way that the total volume level is perceived as constant, i.e. the same as the original volume level, during the synchronously playing of the two files 41 and 42. In other words, the volume level of the first file is faded out while the volume level of the second file is faded out.

When switching the visibility of the players 31 and 32 during the synchronously playing of the files 41 and 42, a visible glitch may still appear to the viewer. This may happen if the two players are not exactly positioned in the same position in the browser window, i.e. when there is an offset between the two players by one or more pixels in the horizontal or vertical direction. This visible glitch may also be caused by an offset in time, i.e. when the two files 41 and 42 are not played exactly synchronously, i.e. when there is an offset between the two players by one or more video frames. The visible effect of this offset may be made less apparent by an equivalent cross fading of the video payload. During the synchronously playing of the two files 41 and 42, the video player 41 is made more and more transparent from time t3 to time t5. Preferably the transparency of the video player 41 is increased from zero to hundred percent, i.e. from not transparent to completely transparent. This way, the second video player 32 that is positioned in the same position as the first player 31 but completely covered by the first player 31, will become more and more visible as the transparency of the first player 31 increases. This way, the visible glitch due to the offset in position or time will be smeared in time and less visible to the viewer. The changing of the transparency of the video player may be done by the CSS "opacity" property.

For the implementation of the method according to the embodiments described above the JavaScript scripting language is preferably used as this language is supported by browser applications supporting the web standards such as HTML, CSS and JavaScript. The JavaScript code is then delivered by the content provider of the video item when the user loads a web page containing the video or when the user starts the playback of the video. The code may be delivered in the form of a library. This way, there is no further need for browser specific plugins such as Flash, Silverlight or QuickTime when streaming a video to the browser application.

The embodiments above have been described for video items comprising both video and audio payload data, but the invention is not limited thereto. The described method may also be applied to audio items that only comprise audio payload data. For the playback in the browser application the subset of audio segments are then stored in the data object 7. From the subset, audio files are then constructed for playback in the browser application. These audio files may for example be formatted as M4A files according to the MPEG-4 Part 14 standard.

The embodiments above have been described for the playback of an HLS stream, but streams according to other streaming protocols using segments may be implemented in a similar way. Examples of such protocols are Microsoft Smooth Streaming (MSS), HTTP Dynamic Streaming (EDS) by Adobe and Dynamic Adaptive Streaming over HTTP defined by the 3GPP standard (DASH).

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. It is to be understood that the terms so used are interchangeable under appropriate circumstances and embodiments of the invention are capable of operating according to the present invention in other sequences, or in orientations different from the one(s) described or illustrated above.

The invention claimed is:

1. A method for playing media in a media player of a browser application, said media including a plurality of media segments that each include video and/or audio payload data encoded by a codec supported by said browser application, said media segments including index information that includes location information about a location of said audio and/or video payload data within said media segments, the method comprising the following steps:
    obtaining by the browser application a first subset of media segments of said media from a content distribution network;
    extracting within the browser application video and/or audio payload data from said first subset of media segments using said index information;
    constructing by the browser application a first media file playable by the media player of the browser application, the first media file comprising said video and/or audio payload data of said first subset of media segments;
    obtaining by the browser application a second subset of media segments of said media from said content distribution network, said second subset being subsequent in time to said first subset;
    extracting within the browser application video and/or audio payload data from said second subset of media segments using said index information;
    constructing by the browser application a second media file playable by the media player of the browser application, the second media file comprising said video and/or audio payload data of said second subset of media segments; and
    playing said first media file and said second media file in the media player of said browser application according to said codec,
    wherein said media segments, as obtained from said content distribution network, are not playable by the media player of the browser application, and
    wherein said video and/or audio payload data of each of said first and second subsets of media segments is directly used in the construction of the first media file and the second medial file, respectively, without transcoding, decoding, or encoding in the browser application.

2. A method for playing media according to claim 1 further comprising:
    starting a streaming session with said content distribution network by retrieving a manifest file from said content distribution network, said manifest file comprising segment information about said media segments, said media segments being available as files on said content distribution network; and
    selecting said first and second subset of media segments using said information about said segments.

3. A method for playing media according to claim 2 wherein said segment information comprises information about the location of each of said segments on said content distribution network, and said obtaining a first subset and said obtaining a second subset comprises retrieving each of said segments of said first and second subset by sending a request to said content distribution network with said location of said segment as an argument.

4. A method for playing media according to claim 3 wherein said streaming session is an HTTP adaptive streaming session; and
    wherein said request is an HTTP GET request.

5. A method for playing media according to claim 2 wherein said manifest file comprises codec information about available versions of said segments, said codec information specifying for each version a corresponding codec used for encoding said audio and/or video payload data of said segments; the method further comprising the step of:
    selecting a version of said segments based on said codec information such that the corresponding codec is supported by said browser application.

6. A method for playing media according to claim 1 wherein said media segments comprise index information, said index information comprising location information about the location of said audio and/or video payload data within said media segments; and wherein the extracting is performed based on said index information; the method further comprising the steps of:
    storing said extracted video and/or audio payload data; and
    using said stored video and/or audio payload data for said constructing steps.

7. A method for playing media according to claim 1 wherein said playing further comprises:
    playing said first media file in a first player of said browser application;
    loading said second media file in a second player of said browser application while playing said first media file;
    starting to play said second media file at the end of playing said first media file.

8. A method for playing media according to claim 7 wherein said first and second players are video players for playing video on a display used by said browser application, said playing further comprising:
    initializing and hiding said second video player before said loading;
    positioning said second video player in the same position as said first video player on said display;
    hiding said first video player at the end of playing said first media file;
    unhiding said second video player at the end of playing said first media file.

9. A method for playing media according to claim 1 wherein said constructing said second media file further comprises:
    putting a copy of said video and/or audio payload data from one or more of the last segments of said first subset of media segments in said second file;
    and wherein said playing comprises:
    playing said first media file in a first player of said browser application;
    loading said second media file in a second player of said browser application while playing said first media file;
    synchronously playing said first and second media file.

10. A method for playing media according to claim 9 wherein said first and second players are video players for playing video on a display used by said browser application, said playing further comprising:

initializing and hiding said second video player before said loading;

positioning said second video player in the same position as said first video player on said display;

hiding said first video player and unhiding said second video player during said synchronously playing.

11. A method for playing media according to claim 10 wherein said first and second video players comprise depth attributes defining the order of appearance in depth when displaying said video players on said display, and wherein said hiding comprises assigning a depth attribute to said first player such that said first video player appears below said second player on said display.

12. A method for playing media according to claim 10 wherein said first and second video player comprise a transparency property for defining the transparency of said first and second video player on said display, and wherein hiding said first video player comprises gradually increasing said transparency of said first video player.

13. A method for playing media according to claim 9 wherein said media segments comprise audio payload data having a volume level, and wherein constructing said first media file comprises fading out said volume level of said audio payload data that will be synchronously played, and wherein constructing said second media file comprises fading in said volume level of said audio payload data that will be synchronously played, said fading in and fading out being performed such that the total volume level stays substantially unchanged.

14. A method for playing media according to claim 9 wherein said media segments comprise audio payload data; and wherein said synchronously playing comprises gradually decreasing the volume level of said first media player; and wherein said synchronously playing further comprises gradually increasing the volume level of said second media player; said gradually decreasing and increasing being performed such that the total volume level stays substantially unchanged.

15. A method for playing media according to claim 1, wherein said first media file and said second media file are respectively constructed such that no plugin is needed to play said first media file or said second media file in the media player of said browser application.

16. A method for playing media according to claim 1, wherein first subset of media segments of said media and said second subset of media segments of said media include segmented but unaltered portions of said video and/or audio payload data.

* * * * *